United States Patent [19]

Hunnicutt, Jr.

[11] Patent Number: 4,986,172
[45] Date of Patent: Jan. 22, 1991

[54] BEVERAGE BREWING APPARATUS

[76] Inventor: Clyde J. Hunnicutt, Jr., 3026 E. Garfield St., Phoenix, Ariz. 85008

[21] Appl. No.: 354,226

[22] Filed: May 18, 1989

Related U.S. Application Data

[63] Continuation-in-part of Ser. No. 189,372, May 2, 1988, abandoned.

[51] Int. Cl.$^5$ .............................................. A47J 31/00
[52] U.S. Cl. ............................................................ 99/306
[58] Field of Search .................. 99/279, 323, 295, 306, 99/304, 316, 317, 321; 426/433

[56]  References Cited

U.S. PATENT DOCUMENTS

| 3,083,101 | 3/1963 | Noury | 99/295 |
| 3,215,060 | 11/1965 | Perlou | 99/306 |
| 3,450,024 | 6/1969 | Martin | 99/295 |
| 3,931,756 | 1/1976 | Van Brunt | 99/306 |
| 4,069,751 | 1/1978 | Gronwick | 99/295 |
| 4,168,656 | 9/1979 | Wolfer | 99/306 |
| 4,666,724 | 5/1987 | Lorenzo | 99/295 |

FOREIGN PATENT DOCUMENTS

1289610 2/1962 France ................................. 99/295

Primary Examiner—Robert W. Jenkins
Attorney, Agent, or Firm—Don J. Flickinger; Jordan M. Meschkow

[57] ABSTRACT

A brewing member includes a reservoir for receiving liquid, such as water, and an integral receptacle for holding beverage making material, such as ground coffee. The device is positionable upon a conventional drinking vessel for brewing a single serving of beverage, such as coffee. The device is also usable with a conventional beverage making appliance, such as the basket of a coffee maker, to produce a less than normal quantity of beverage. Further provided is a support member for holding a brewing member and positionally engageable with a drinking vessel.

31 Claims, 4 Drawing Sheets

BEVERAGE BREWING APPARATUS

Cross-Reference to Related Application

This application is a continuation-in-part of my earlier application entitled "Beverage Brewing Apparatus", which was filed on May 2, 1988 and assigned serial number 189,372, now abandoned.

BACKGROUND OF THE INVENTION

1. Field of the Invention

This invention relates to beverage making devices.

More particularly, the present invention relates to apparatus for brewing a beverage from liquid and beverage making material.

In a further and specific aspect, the instant invention concerns apparatus especially adapted for customized brewing of selected beverages.

2. The Prior Art

The non-commercial brewing of beverages is a sphere of considerable importance. Especially notable is the making of tea or coffee in the home or the workplace. To accommodate extensive consumer demand, manufacturers have provided a profusion of variously configured brewing devices. Companionably, beverage making material, such as ground coffee and prepared tea leaves, is readily available in grocery stores, convenience outlets and other retail establishments.

Devices for brewing coffee, for example, are commercially available in a seemingly endless array of esthetic and functional designs. Exemplary is the familiar contemporary electric appliance known as a coffee maker. In general, the device includes a reservoir for receiving and holding water, a basket for containing a filter and ground coffee, and a carafe. In response to electrically operated means, the water is heated and transferred to the basket wherein the coffee is brewed. The beverage then passes to the carafe which usually rests upon a heating element for heated storage.

Due in large part to convenience, coffee makers of the above type have achieved extreme popularity. However, certain inherent limitations are apparent. Notable is the fact that a single device is incapable of satisfactorily accommodating group requirements and individual needs. The commonly prescribed capacity is relatively substantial, usually ten or twelve cups. The brewing of a lesser quantity, such as one or two cups is exceedingly inefficient and ineffective. The demands of the individual, therefore, are fulfilled either by the brewing of the full capacity of the coffee maker or the purchase of an additional device of reduced capacity. Both are considered to be a waste of resources and an undue financial burden.

It would be highly advantageous, therefor, to remedy the foregoing and other deficiencies inherent in the prior art.

Accordingly, it is an object of this invention to provide improvements in the brewing of beverages from liquid and beverage making material.

Another object of the invention is the provision of ameliorated means for brewing smaller or individualized quantities of selected beverages.

And another object of the invention is to provide an adapter for effectively reducing the capacity of a standard beverage brewing device.

Still another object of the present invention is the provision of an adapter which is readily and conveniently usable in connection with a conventional coffee maker or similar beverage brewing device.

Yet another object of the invention is to provide means for brewing a lesser quantity of beverage which will emulate the standard brewing characteristics of the beverage brewing device being used therewith.

Yet still another object of the instant invention is the provision of an adapter which is removably receivable within a standard commercially available brewing device without modification thereof.

A further object of the invention is to provide an adapter of the foregoing character which is alternately couplable with a conventional drinking vessel to produce a single serving of beverage.

And a further object of the immediate invention is the provision of an adapter which can brew various selected beverages from standard commercially available beverage making material.

Still a further object of the invention is to provide an adapter which is optionally usable with a conventional prior art disposable filter or with an especially devised reusable filter.

And still a further object of the invention is the provision of means according to the foregoing which is relatively simple and economical to manufacture.

SUMMARY OF THE INVENTION

Briefly, to achieve the desired objects of the instant invention in accordance with a preferred embodiment thereof, first provided is a brewing member including a liquid pervious receptacle for receiving and holding beverage making material and a reservoir for supplying liquid to the receptacle. The receptacle includes a foraminous endwall and an endless sidewall upstanding from the endwall. Preferably, the receptacle depends from the reservoir. The reservoir includes an endless sidewall which is contiguous with the upper edge of the sidewall of the receptacle. The reservoir further includes an open top for receiving the liquid therethrough.

In accordance with an embodiment of the invention, the endwall is spaced from the lower edge of the sidewall of the receptacle thereby defining a space between the endwall and the surface upon which the brewing member is supported. Vent means communicate between the space and the ambient environment. Specifically, the vent means may include an opening extending through the sidewall of the receptacle intermediate the lower edge thereof and the endwall. In a further embodiment of the invention, the receptacle includes an inner wall upstanding from the endwall and spaced from the sidewall to define an endless chamber therebetween for holding the beverage making material.

The brewing member is usable in combination with a beverage making machine for producing a lesser quantity of beverage than the standard quantity of beverage for which the machine was designed. For such use, the brewing member resides within the basket of the beverage making machine to receive liquid from the integral liquid dispensing means. Support means stabilize the brewing member within the basket. A preferred support means is in the form of a plurality of outwardly extending angularly spaced members, each having a surface for bearing upon the bottom of the basket. The support means also uphold the brewing member upon the top of a vessel for direct flow of the beverage into the vessel, such as a drink container.

The support means may also assume the form of a support member for receiving and holding the brewing member and for bearing upon the upper edge of a vessel. In a preferred embodiment, the support member includes an upstanding endless sidewall having an open upper end for receiving the brewing member, a transverse bottom for bearing upon the vessel and for receiving the brewing member thereon and an opening in the bottom for flow of beverage from the brewing member into the vessel. Preferably, the bottom of the support member includes an endwall and spacer means for holding the brewing member at a location spaced above the endwall. Specifically, the endwall may generally assume the form of an inverted cone extending downwardly inward from the sidewall and the spacer means assume a plurality of ribs upstanding from the endwall for receiving the brewing member thereon. It is also preferred that the support member include retention means for locationally positioning and retaining the support member upon the vessel. In a preferred embodiment, the retention means is in the form of a retention member depending from the bottom of the support member and engageable with the vessel for locationally positioning the support member relative to the top of the vessel. Vent means, such as an elongate passage, communicates between the interior of the vessel and the ambient environment.

Also contemplated by the invention is a substantially rigid beverage pervious filter member removably receivable within the receptacle intermediate the endwall and the beverage making material. In a specifically preferred embodiment, the filter member includes an exterior wall for residing in juxtaposition with the sidewall of the receptacle and at least one groove traversing the exterior wall and having an open side closed by the sidewall. Means are provided for defining a beverage receiving chamber intermediate the filter member and the endwall of the receptacle and communicating with the groove.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings in which:

FIG. 11 is an enlarged fragmentary sectional view illustrating an alternate embodiment of the brewing member of the invention.

DETAILED DESCRIPTION OF THE PREFERRED EMBODIMENTS

Figures 1, 2:
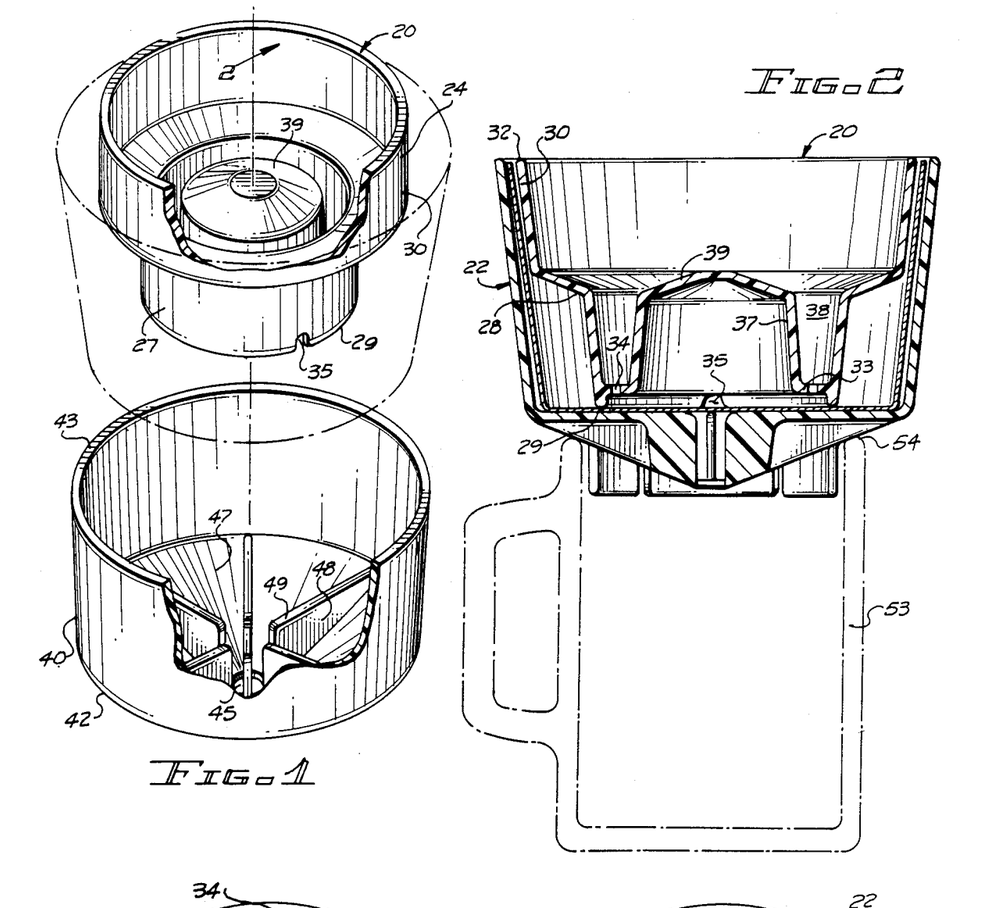
FIG. 1 is an exploded perspective view of a beverage brewing apparatus constructed in accordance with the teachings of the instant invention, portions thereof being broken away for purposes of illustration.
FIG. 2 is a vertical sectional view taken along the line 2—2 of FIG. 1 and illustrating the beverage brewing apparatus as it would appear when assembled and being used in combination with a vessel, the vessel being illustrated as a cup in broken outline.

Turning now to the drawings in which like reference characters indicate corresponding elements throughout the several views, attention is first directed to FIG. 1 which illustrates a beverage brewing apparatus including a brewing member and a support member generally designated by the reference characters 20 and 22, respectively. An exemplary embodiment of the instant invention, the apparatus is especially adapted for use in combination with a vessel for producing beverage from liquid and beverage making material. An exemplary vessel is the cup or mug generally designated by the reference character 23 and shown in broken outline in FIG. 2. A further understanding of the apparatus will be had as the description ensues.

Brewing member 20 includes reservoir 24 and receptacle 25. In the embodiment herein chosen for purposes of illustration, the member is generally cylindrical with receptacle 25 being concentric with and depending from reservoir 24. Preferably the member is integrally molded of a generally rigid plastic material. Receptacle 25 is defined by upstanding endless sidewall 27 having upper edge 28 and lower edge 29. Sidewall 30, contiguous with the upper edge 28 of sidewall 27 and terminating with upper edge 32, defines reservoir 24. Upper edge 32 also defines an open top for reservoir 24.

Figure 3:
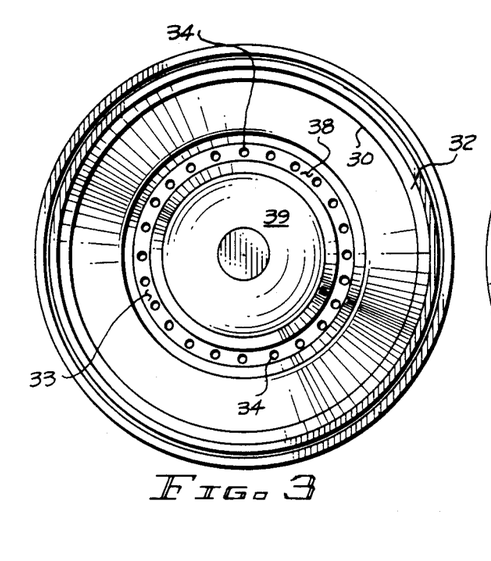
FIG. 3 is a top plan view of the assembled apparatus of FIG. 1.

Transverse wall 33, as seen with further reference to FIG. 3, resides proximate the lower end of brewing member 20 at a location spaced slightly above lower edge 29 of sidewall 27. A plurality of openings 34 extend through transverse wall 33. At least one vent opening 35 projects through sidewall 27 intermediate wall 33 and lower edge 29. In accordance with the immediate preferred embodiment of the invention, for purposes which will be explained presently, upstanding inner wall 37 projects from bottom 33. Inner wall 37 cooperates with sidewall 27 to define an endless chamber 38. The upper portion of inner wall 37 slopes upwardly and inwardly toward the center of reservoir 24 to define a dome-like surface 39.

Figure 4:
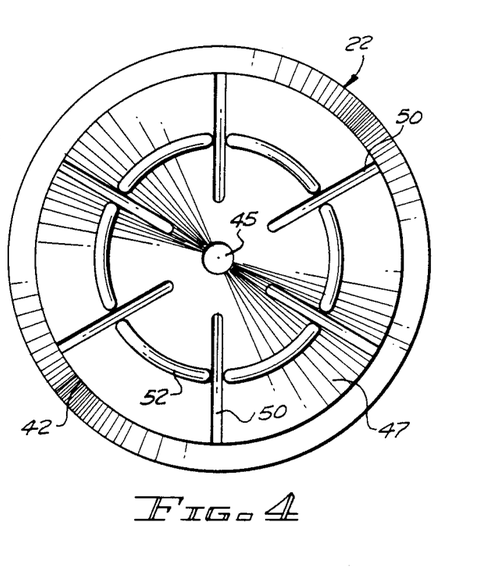
FIG. 4 is a bottom plan view of the apparatus of FIG. 1.

Support member 22, also chosen for purposes of illustration as a generally cylindrical structure as seen in FIG. 1, includes upstanding endless sidewall 40 having lower edge 42 and upper edge 43. Upper edge 43 defines an open top. Bottom 44, having opening 45 therethrough, traverses support member 22 proximate the lower edge 42 of sidewall 40. Bottom 44 includes endwall 46 which is preferably in the form of an inverted cone extending downwardly inward from sidewall 40 to the centrally located opening 45. Bottom 45 further includes a plurality of angularly spaced ribs 48 upstanding from endwall 46. Each of the several ribs 48 terminate with a top surface 49. Preferably, the several surfaces 49 lay in a single horizontal plane. With further reference to FIGS. 2 and 4, it is seen that an elongate slit 50 is carried in the underside of each rib 48. Preferably, each slit 50 extends from the outer end of the respective rib to a location spaced from the inner end and is open on the underside. Also seen is annular projection 52 depending from bottom 46.

The brewing apparatus described above is especially adapted for brewing a single serving of beverage which will flow directly into the selected drinking vessel. Vessel 23, typical of vessels in general and illustrated for purposes of orientation, includes upstanding sidewall 53 having upper edge 54. Use of the apparatus of the instant of the instant invention commences with the placement of support member 22 upon vessel 23 with endwall 47 bearing upon upper edge 54 and projection 52 received within sidewall 53. Projection 52 functions as a retention member for locational positioning of support member 22 relative to the vessel 23. A conventional commercially available filter 55 of the type normally used in connection with electric coffee maker appliances is then positioned within the support member 22. Brewing member 20 is placed within filter 55 with lower edge 29 of sidewall 25 bearing upon the several surfaces 49. A single serving of beverage making material, such as prepared tea leaves or ground coffee, is evenly distributed within chamber 38. Finally, a single serving of liquid, such as hot water, is poured into reservoir 24. Subsequently, the liquid passes through the material within chamber 38, the several openings 34, filter 55 and opening 45 into vessel 23.

Dwell time, i.e. the length of time for the liquid to pass through the beverage making material, is exceedingly important to proper brewing. Low dwell time (fast flow of the liquid through the material) will yield a weak beverage. Chamber 38 is especially devised to hold a lesser quantity of material, such as the amount of ground coffee necessary for a single serving of beverage, in a cross-sectional area of sufficient height to ensure proper brewing. Experimentation has shown that one tablespoon of ground coffee held at a height of approximately 0.75 inches will brew a single cup of properly brewed coffee in approximately 2 to 2.5 minutes. Experimentation has also shown that the vent openings 35 encourage the flow of beverage when filter 55 is used. Without the openings 35, the length of time for the brewing process is approximately doubled. The brewing process is also expedited by the several slits 50 which function as vents for escape of gasses, air and steam, as the beverage enters vessel 23.

Figure 5:
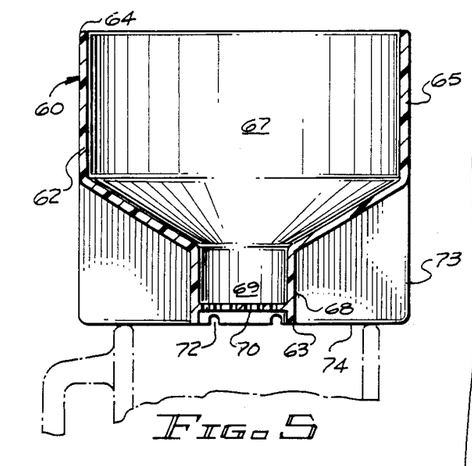
FIG. 5 is a view generally similar to the illustration of FIG. 2 and illustrating an alternate embodiment of the invention.
Figure 6:
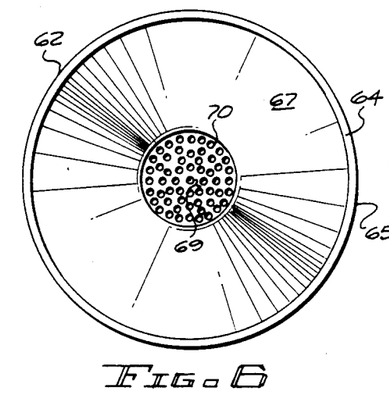
FIG. 6 is a top plan view of the apparatus of FIG. 5.

Reference is now made to FIG. 5 which illustrates an alternate brewing member, generally designated by the reference character 60, having sidewall 62 with lower edge 63 and upper edge 64. The upper portion 65 of sidewall 62 defines reservoir 67 while the lower portion 68 defines receptacle 69. Upper edge 64 defines an open top for reservoir 67. Foraminous endwall 70, as seen with additional reference to FIG. 6, resides at a spaced relationship from lower end 63 and functions as the bottom for receptacle 69. Vent opening 72 extend through sidewall 62 intermediate lower edge 63 and endwall 70.

Brewing member 60 is generally analogous to previously described brewing member 20. Sidewall 62 is endless. For purposes of illustration, sidewall 62 is shown as being circular in cross-section although other shapes, such as square or hexagonal, will be readily apparent to those skilled in the art. Also for purposes of illustration, receptacle 69 is shown as concentrically depending from reservoir 67.

Figure 7:
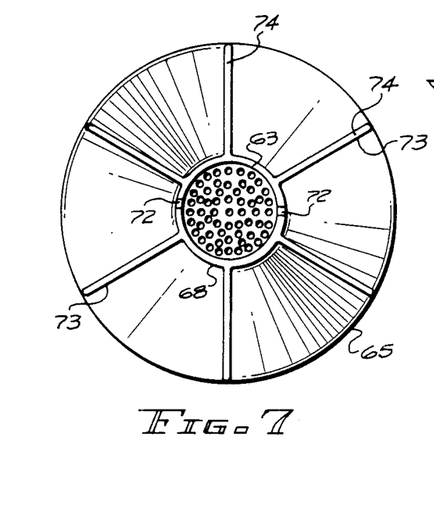
FIG. 7 is a bottom plan view of the apparatus of FIG. 5.

The immediate embodiment includes integral support means in the form of a plurality of support members 73. As seen with specific reference to FIGS. 5 and 7, the several support members extend outwardly in an angularly spaced array. Each of the support members terminates with a bottom surface 74. Each of the several surfaces 74 lay in a single plane capable of bearing upon a selected surface and supporting brewing member 60 in an upright position. As particularly seen in FIG. 5, the several support members 73 are capable of supporting the brewing member 60 upon the upper edge 54 of coffee cup 23 for the brewing of a beverage which will flow directly into cup 23. The brewing procedure utilizes beverage making material and liquid as previously described in detail.

In the foregoing description, beverage brewing apparatus 20 and beverage brewing apparatus 60 are characterized as having particular utility in combination with a drinking vessel for the brewing of a single serving of beverage. The brewing members are also useful in connection with a conventional commercially available beverage making machine as typically represented by the coffee maker generally designated by the reference character 80 in FIG. 8. Typically, coffee maker 80 includes housing 82 which carries liquid dispensing means including means for holding and for heating water. Basket 83 having open top 84 and liquid pervious bottom 85 normally holds a filter with ground coffee therein. The basket receives heated water from the dispensing means to brew coffee which then drains into carafe 87 which rests upon heating element 88. Coffee maker 80 is briefly set forth for purposes of orientation and reference. Elements and functions not specifically set forth will be readily appreciated by those skilled in the art.

Coffee makers of the foregoing type are available in sizes designated by capacity, usually ten cup or twelve cup. The capacity is determined by the size of the well which holds the water. The basket is sized to hold a corresponding quantity of ground coffee at a height for acceptable brewing. It is apparent, therefore, that the machine utilizes a standard quantity of water and a standard quantity of ground coffee to yield a standard quantity of beverage. A lesser quantity of beverage can not be satisfactorily brewed. While the dispensing means is capable of handling a lesser quantity of water, the lesser quantity of ground coffee will be dispersed over the bottom of the basket at a height insufficient for proper dwell time for the water to interact properly with the ground coffee.

Figure 8:
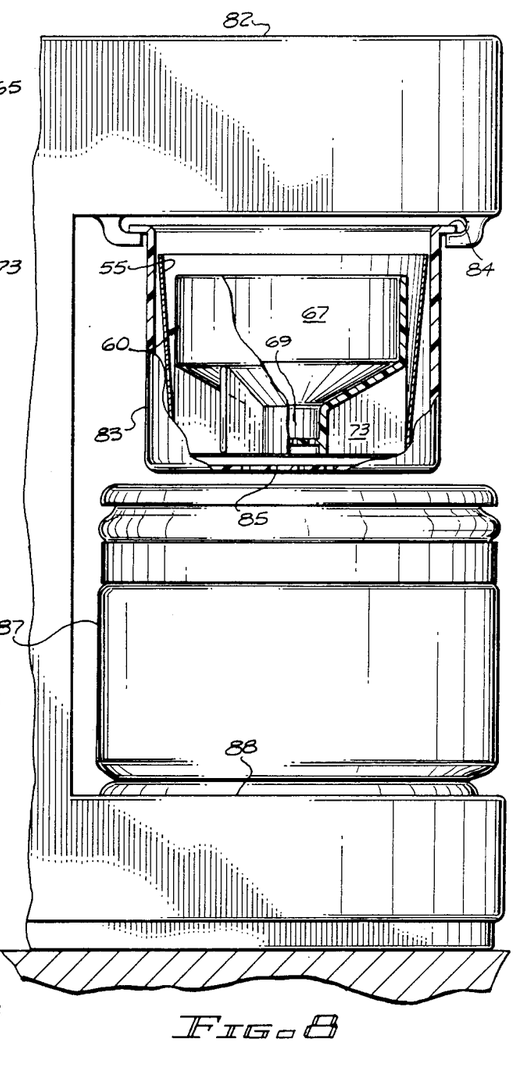
FIG. 8 is a fragmentary side elevation view of a conventional beverage making machine as it would appear when being used in combination with the apparatus of FIG. 5, portions thereof being broken away for purposes of illustrations.

Brewing member 60, as seen with further reference to FIG. 8, is sized to be received within basket 83 and supported upon bottom 85 by support members 73. Optionally, filter 55 may be placed into basket 83 prior to the insertion of brewing member 60. Receptacle 69 holds the lesser quantity of coffee, generally sufficient for one or two servings of beverage at an adequate height for proper brewing of beverage from the reduced quantity of water which is dispensed from the liquid dispensing means into the reservoir 67. Brewing member 20 is similarly useful.

Figure 9:
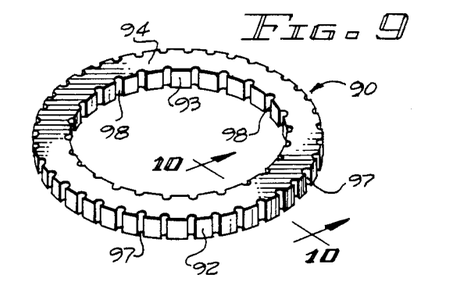
FIG. 9 is a perspective view of a filter member useful in connection with the instant invention.
Figure 10:
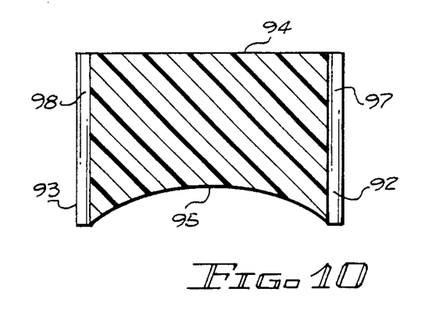
FIG. 10 is an enlarged vertical sectional view taken along the line 10—10 of FIG. 9.

A filter member, generally designated by the reference character 90, which is usable in combination with the previously described brewing member of the instant invention will now be described with reference to FIGS. 9 and 10. Preferably fabricated of a rigid material, such as injection molded plastic, filter member 90 provides an alternative to the conventional disposable filter 55 as previously described. The immediate embodiment, which is especially devised for use in combination with brewing member 20 includes exterior wall 92, interior wall 93, top surface 94 and bottom surface 95. A plurality of exterior grooves 97, as best seen in FIG. 10 traverse exterior wall 92 between top surface 94 and bottom surface 95. Similar interior grooves 98 extend the height of the interior wall 93. Each groove has an open exterior side. Filter member 90 is mating received within chamber 38 whereby sidewall 27 effectively closes the open side of each groove 97 and sidewall 37 effectively closes the open side of each groove 98.

Filter member 90 rests upon endwall 33 and receives the beverage making material thereon. The grooves 97 and 98 may be of any desired size. In connection with the brewing of coffee, experimentation has shown that grooves having cross-sectional measurements of approximately 0.020 inches are effective in separating the beverage from the beverage making material. To provide an effective flow of beverage from the grooves 97 and 98 to the openings 34, a beverage receiving chamber is formed intermediate filter member 90 and transverse wall 33. Preferably, surface 95 is concave in cross-section for this purpose. A similar disk-like structure in which top surface 94 extends continuously within the confines of exterior wall 92 is usable in combination with the embodiment of the brewing member designated by the reference character 60. As will be appreciated by those skilled in the art, filter member 90 may be rendered beverage pervious by means other than grooves 97 and 98. Exemplary alternates may include texturing of surfaces 92 and 93 or a plurality of liquid pathways extending through the filter member.

FIG. 11 shows an alternative embodiment of the invention, which is substantially similar to the embodiment of FIG. 1-4, except that the top portion of inner sidewall 100 of brewing member 102 forms a depression or well 104 rather than a dome-like surface. This configuration was developed after numerous trials with the first embodiment showed that boiling water impinging on the dome-like surface tended to gush rapidly into the receptacle 25, thus digging up loose beverage making material and resulting in non-uniform and unpredictable brewing behavior.

When boiling water was poured into the reservoir 106 of the embodiment of FIG. 11, on the other hand, the water tended to first accumulate in the depression 104 and then spill gently over the sidewall 100 without disturbing the loose beverage making material. This resulted in a more even distribution of material in the receptacle 108 and improved the quality of the brew.

Figures 12, 13, 14, 15, 16, 17:
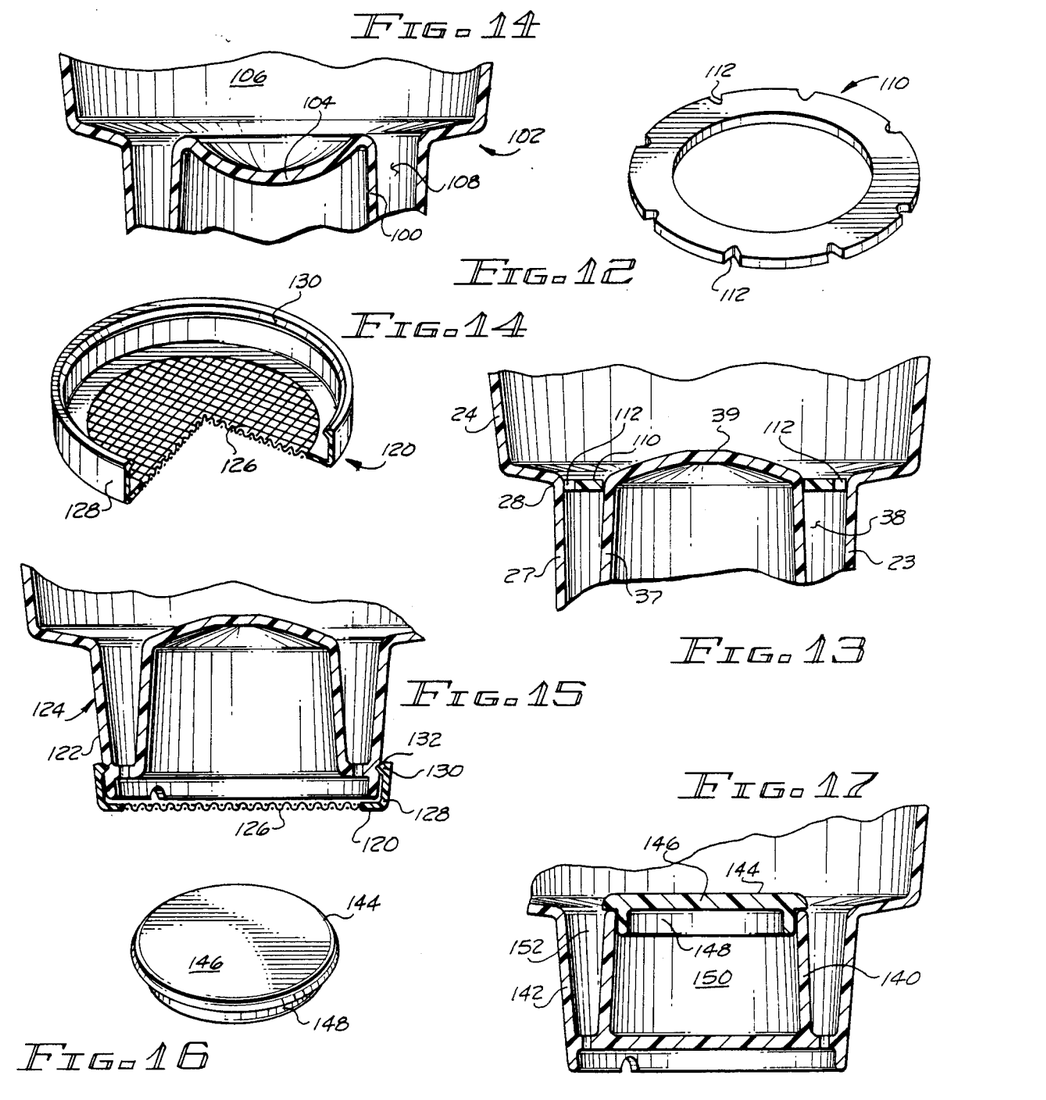
FIG. 12 is a perspective view of a control ring useful in connection with the embodiment of FIGS. 1-4.
FIG. 13 is a fragmentary sectional view showing the control ring of FIG. 12 in use with the brewing member of FIGS. 1-4.
FIG. 14 is a perspective view, partially broken away, of a filter member useful in connection with an alternative embodiment of the invention.
FIG. 15 is a fragmentary sectional view showing the filter of FIG. 14 assembled on an alternative embodiment of the brewing member.
FIG. 16 is a perspective view showing a removable lid for use with another embodiment of the invention.
FIG. 17 is a fragmentary sectional view showing the removable lid of FIG. 16 mounted on an alternative embodiment of the brewing member.

Alternatively, the brewing member 20 of the embodiment of FIGS. 1-4 may be used in combination with a control ring 110, which retards the flow of water into the receptacle 25 in much the same manner as the depression 104 in the embodiment of FIG. 1. As shown in FIGS. 12 and 13, the control ring 110 comprises an annular body, preferably fabricated of a rigid material such as injection molded plastic, which is dimensioned to be inserted between the inner wall 37 and the upper edge 28 of sidewall 27 of the coffee receptacle 25, thereby forming a removable ceiling above chamber 38. A plurality of grooves or notches 112 are formed along the outer circumference of the ring 110. Each groove or notch 112 has an open exterior side which is closed by sidewall 27 when the ring 110 is properly positioned within the chamber 38. Thus, the notches 112 form passageways which allow water to drain slowly into the chamber 38 rather than gushing in and dislodging the coffee as when the ring 110 is not present.

FIGS. 14 and 15 show yet another embodiment of the invention, in which a filter member 120 is removably mounted on the lower edge of the sidewall 122 of the receptacle 124. The filter member 120 preferably comprises a fine mesh screen 126 having very small openings for preventing the beverage making material from escaping. Although the screen 126 may be coupled to the bottom of the receptacle 124 using any conventional methods, it is shown here for exemplary purposes as being mounted in a substantially cylindrical lid member 128 having an annular bead 130 formed along the inner surface of its sidewall. The bead 130 snaps into a mating groove 132 formed on the outer surface of the sidewall 122 of the coffee receptacle 124. This coupling arrangement allows the filter member 120 to be easily snapped off the receptacle 124, cleaned, and reused repeatedly, thereby resulting in substantial savings over the disposable filters used in the previous embodiments.

FIGS. 16 and 17 show another embodiment of the invention, in which the cylindrical inner sidewall 140 of the coffee receptacle 142 is provided with a removable plug-type lid 144. For the purposes of illustration, the lid 144 is shown to comprise a disk-shaped upper portion 146 and a depending sidewall 148 which engages the inner surface of inner sidewall 140 of the receptacle 142.

The removable lid 144 enables the region encircled by inner sidewall 140 to be used as a storage chamber 150 for holding a single serving of beverage making material. This embodiment is especially useful for traveling. Before departure, a traveler simply places a single serving of beverage material into the storage chamber 150, and covers it with lid 144 to prevent spillage. Then, when a beverage is desired, the traveller simply removes the lid, transfers the beverage material from the storage chamber 150 to the brewing chamber 152, and proceeds to brew the beverage using the same procedure as in the previous embodiments.

Figure 18:
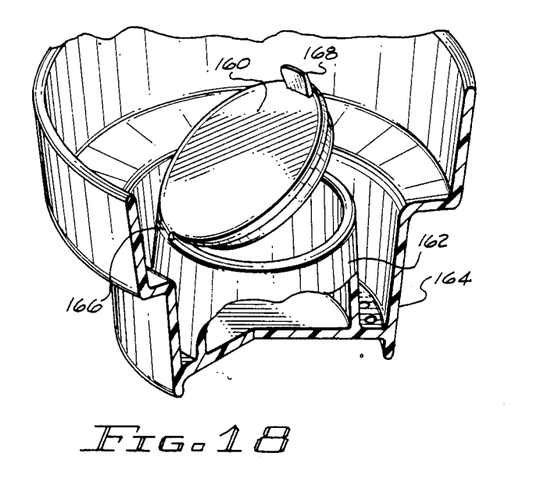
FIG. 18 is a fragmentary perspective view, partially broken away, of still another embodiment of the brewing member.
Figure 19:
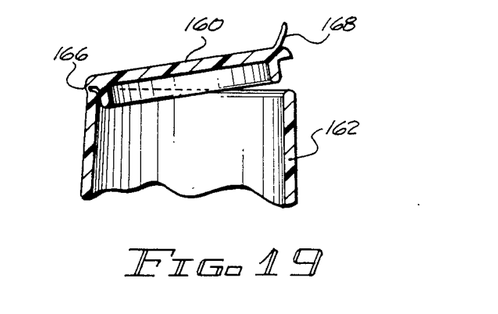
FIG. 19 is a fragmentary sectional view of the brewing member shown in FIG. 18.

The embodiment of FIGS. 18 and 19 is substantially identical to that of FIGS. 16 and 17, except that lid member 160 is movably coupled to the inner sidewall 162 of the receptacle 164 by means of a flexible hinge 166. In addition, a thumb tab 168 is provided opposite the hinge 166 to facilitate opening and closing of the lid 160.

Figure 20:
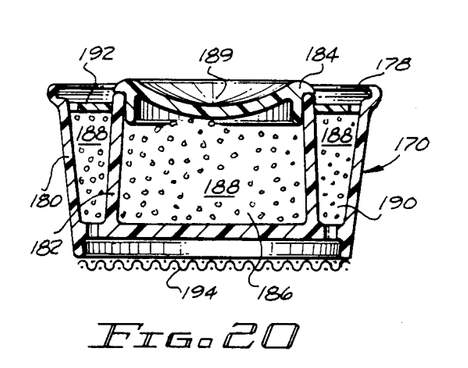
FIG. 20 is a sectional view of a detachable receptacle usable with yet another embodiment of the invention.
Figure 21:
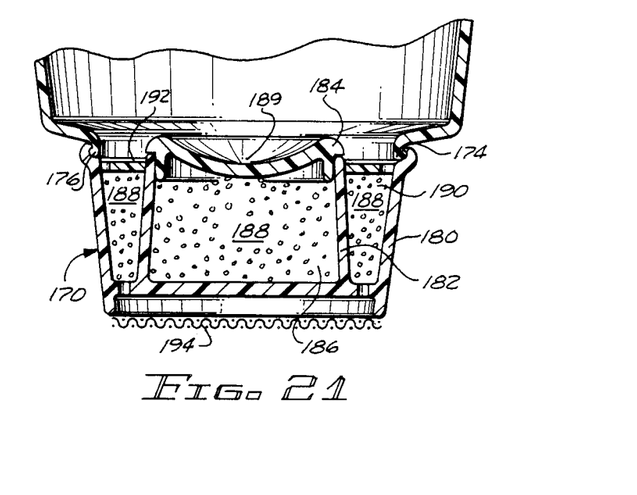
FIG. 21 is a fragmentary sectional view showing the detachable receptacle of FIG. 20 mounted on an alternative embodiment of the brewing member.

FIGS. 20 and 21 show still another embodiment of the invention, in which the receptacle 170 is detachably carried on the bottom edge of the reservoir 172. The reservoir 172 is provided with a depending neck 174. An annular bead 176 on the neck 174 snappingly engages a mating groove 178 formed along the inside upper edge of the sidewall 180 of the receptacle 170.

The receptacle 170 may be fabricated from a disposable material such as wax-impregnated paper and marketed in the form of a pre-filled "travel pack". More specifically, the inner wall 182 may be provided with a removable lid 184 to define a storage chamber 186, as in the embodiment of FIGS. 16 and 17, and the chamber 186 may be filled prior to purchase with a single serving of beverage brewing material 188. The upper surface of removable lid 184 forms a depression or well 189 which functions in the same manner as in the embodiment of FIG. 11.

The endless chamber 190 between inner sidewall 182 and outer sidewall 180 of the receptacle 170 may also be filled with beverage brewing material 188, thus providing a total of two servings. A frangible seal 192, such as a layer of foil or paper, is provided over the endless chamber 190, thus preventing spillage and exposure of the brewing material 188 to air.

To use the apparatus according to the embodiment of FIGS. 20 and 21, the consumer simply removes the frangible seal 192 from the endless chamber 190, snaps the receptacle 170 onto the neck 174 of the reservoir 172, and brews the beverage in the same manner as in the previous embodiments. There is no need for a separate disposable filter between the brewing member and the support member (not shown), as the bottom wall of the receptacle 170 is provided with an integrally attached filter 194.

When a second cup of beverage is desired, the consumer removes the lid 189 from the storage chamber 188 and transfers the brewing material 188 into the endless chamber 190. After brewing the beverage in the same manner as before, the consumer may dispose of the receptacle 170 as desired.

Figure 22:
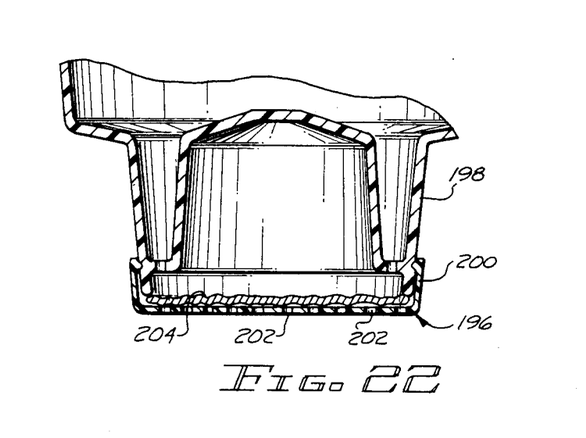
FIG. 22 is a fragmentary sectional view showing still another embodiment of the brewing member.

The embodiment of FIG. 22 is similar to that of FIG. 15, wherein the removable filter member 196 mounted on the lower end of the receptacle 198 comprises a substantially solid lid 200 having a plurality of perforations 202 formed in its transverse surface. A circular cloth or paper filter 204 is removably held between the lid 200 and the bottom edge of the receptacle 198. The cloth or paper filter 204 may be discarded and replaced as needed.

Various modifications and variations to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described and disclosed the instant invention and alternately preferred embodiments thereof in such clear and concise terms as to enable those skilled in the art to understand and practice the same the invention claimed is:

I claim:

1. An adapter for use in combination with a beverage making machine, which machine includes
    liquid dispensing means, and
    a basket having a liquid pervious bottom and having an open top for receiving liquid from the dispensing means,
    said basket normally receiving and holding a filter having beverage making material therein,
    said machine normally utilizing a standard quantity of liquid and a standard quantity material to yield a standard quantity of beverage,
said adapter being configured for placement within said basket to produce a selected lesser quantity of beverage and comprising:
    (a) a liquid pervious receptacle for receiving and holding a selected quantity of said material;
    (b) a reservoir for receiving liquid from said dispensing means and communicating with said receptacle; and
    (c) means for demountably connecting said receptacle to said reservoir.

2. The adapter of claim 1, further including support means for stabilizing said adapter within said basket.

3. The adapter of claim 2, wherein said support means includes a plurality of outwardly extending, angularly spaced members, each having a surface for bearing upon the bottom of said basket.

4. An adapter for use in combination with a beverage making machine, which machine includes
    liquid dispensing means, and
    a basket having a liquid pervious bottom and having an open top for receiving liquid from the dispensing means,
    said basket normally receiving and holding a filter having beverage making material therein,
    said machine normally utilizing a standard quantity of liquid and a standard quantity of material to yield a standard quantity of beverage,
said adapter being configured for placement within said basket to produce a selected lesser quantity of beverage and comprising:
    a liquid pervious receptacle for receiving and holding a selected quantity of said material and including
        (i) an endless upstanding sidewall having an upper edge and lower edge, and
        (ii) a foraminous transverse wall spaced closer to said lower edge than said upper edge; and
    (b) a reservoir for receiving liquid from said dispensing means and communicating with said receptacle and including
        (i) an endless sidewall contiguous with the upper edge of the sidewall of said receptacle, and
        (ii) an open top for receiving said liquid therethrough.

5. The adapter of claim 4, wherein:
    (a) the lower edge of the sidewall of said receptacle bears against the bottom of said basket; and
    (b) said transverse wall is spaced from said lower edge, thereby defining a space between the transverse wall of said adapter and the bottom of said basket.

6. The adapter of claim 5, further including vent means communicating between said space and the ambient environment.

7. The adapter of claim 6, wherein said vent means includes an opening extending through the sidewall of said receptacle intermediate the lower edge thereof and said transverse wall.

8. The adapter of claim 4, wherein said receptacle further includes an endless inner wall upstanding from said transverse wall and spaced from said sidewall to define an endless chamber therebetween for holding said material.

9. The adapter of claim 8, wherein said receptacle further includes an upper portion connected to said inner wall for defining a surface upon which liquid from said reservoir impinges before entering said endless chamber.

10. The adapter of claim 9, wherein said portion is dome-shaped.

11. The adapter of claim 10, further comprising a control ring mounted between said endless inner wall and the upper edge of the sidewall of said receptacle for retarding the flow of said liquid into said endless chamber.

12. The adapter of claim 11, wherein said control ring comprises an annular body removably inserted between said endless inner wall and the sidewall of said receptacle, said annular body comprising at least one groove formed along the outer circumference thereof and having an open side closed by said sidewall to form a passageway for allowing liquid to flow into said receptacle.

13. The adapter of claim 9, further comprising a depression formed in said upper portion for retarding the flow of said liquid into said endless chamber.

14. The adapter of claim 8, further comprising a storage chamber surrounded by said inner wall for storing said material during transport.

15. The adapter of claim 14, further comprising a lid for preventing spillage of said material from said storage chamber.

16. The adapter of claim 15, further comprising hinge means for pivotably coupling said lid to said endless sidewall.

17. The adapter of claim 8, further comprising sealing means extending over said endless chamber for retaining said material in said endless chamber and preventing exposure of said material to air during transport.

18. The adapter of claim 17, wherein said sealing means comprises a frangible seal extending between said sidewall and said endless inner wall.

19. The adapter of claim 4, wherein said receptacle further comprises coupling means for demountably connecting said foraminous transverse wall to said endless upstanding sidewall.

20. The adapter of claim 4, wherein said foraminous transverse wall comprises a mesh screen.

21. An adapter for use in combination with a beverage making machine, which machine includes
liquid dispensing means, and
a basket having a liquid pervious bottom and having an open top for receiving liquid from the dispensing means,
said basket normally receiving and holding a filter having beverage making material therein,
said machine normally utilizing a standard quantity of liquid and a standard quantity of material to yield a standard quantity of beverage,
said adapter being configured for placement within said basket to produce a selected lesser quantity of beverage and comprising:
(a) a liquid pervious receptacle for receiving and holding a selected quantity of said material;

22. An apparatus for use in combination with a vessel having an upper edge defining an open top and for producing beverage from liquid and beverage making material, said apparatus comprising:
(a) a brewing member including
   (i) a reservoir for receiving said liquid, and
   (ii) a liquid pervious receptacle for receiving and holding said beverage making material and for receiving said liquid from said reservoir; and
(b) support means for upholding said brewing member upon the top of said vessel whereby said beverage flows from said brewing member into said vessel, said support means including a support member for receiving and holding said brewing member and for bearing upon the upper edge of said vessel, said support member including
   (i) an upstanding endless sidewall having an open upper end for receiving said brewing member;
   (ii) a transverse bottom for bearing upon said vessel and for receiving said brewing member thereon, said bottom including
an endwall generally in the form of an inverted cone extending downwardly inward from the sidewall of said support member, and
spacer means for holding said brewing member at a location spaced above said endwall, said spacer means including a plurality of ribs upstanding from said endwall; and
   (iii) an opening in said bottom for flow of beverage from said brewing member into said vessel.

23. The apparatus of claim 22, wherein said support means includes a plurality of angularly spaced members extending outwardly from said brewing member to bear upon the upper edge of said vessel.

24. The apparatus of claim 22, further including retention means for locationally positioning and retaining said support means upon said vessel.

25. The apparatus of claim 22, further including a retention member depending from the bottom of said support member and engageable with said vessel for locationally positioning said support member relative to the open top of said vessel.

26. The apparatus of claim 22, wherein said support member further includes vent member communicating between the interior of said vessel and ambient environment.

27. The apparatus of claim 26, wherein said vent means includes an elongate passage formed in said bottom.

28. A device for brewing beverage from liquid and beverage making material, said device comprising:
(a) a liquid pervious receptacle for receiving and holding said beverage making material and including
   (i) a foraminous endwall, and
   (ii) an endless sidewall upstanding from said endwall;
(b) a reservoir for supplying said liquid to said receptacle and
(c) a substantially rigid beverage pervious filter member removably receivable within said endwall and said beverage making material, said filter member including:
   (i) an exterior wall for residing in juxtaposition with the sidewall of said receptacle; and (ii) at least one groove traversing said exterior wall and having open sides closed by said sidewall.

29. The device of claim 28, further including means for defining a beverage receiving chamber intermediate said filter member and said endwall and communicating with said at least one groove.

30. A device for brewing beverage from liquid and beverage making material said device comprising:
   (a) a liquid pervious receptacle for receiving and holding said beverage making material and including
      (i) a foraminous endwall,
      (ii) an endless sidewall upstanding from said endwall, and
      (iii) an endless inner wall upstanding from said endwall and spaced from said sidewall to define an endless material chamber therebetween;
   (b) a reservoir for supplying said liquid to said receptacle; and
   (c) a substantially rigid beverage pervious filter member removably receivable within said chamber intermediate said endwall and said beverage making material, said filter member including
      (i) an exterior wall for residing in juxtaposition with the sidewall of said receptacle;
      (ii) an interior wall for residing in juxtaposition with the inner wall of said receptacle;
      (iii) at least one groove traversing said exterior wall and having an open side closed by said sidewall; and
      (iv) at least one groove traversing said interior wall and having an open side closed by said inner wall.

31. The device of claim 30, further including means for defining a beverage receiving chamber intermediate said filter member and said endwall and communicating with each of said at least one groove.

* * * * *